Oct. 19, 1937.   M. L. SPAHR   2,096,139
MOTOR MOUNTING
Filed Aug. 21, 1935
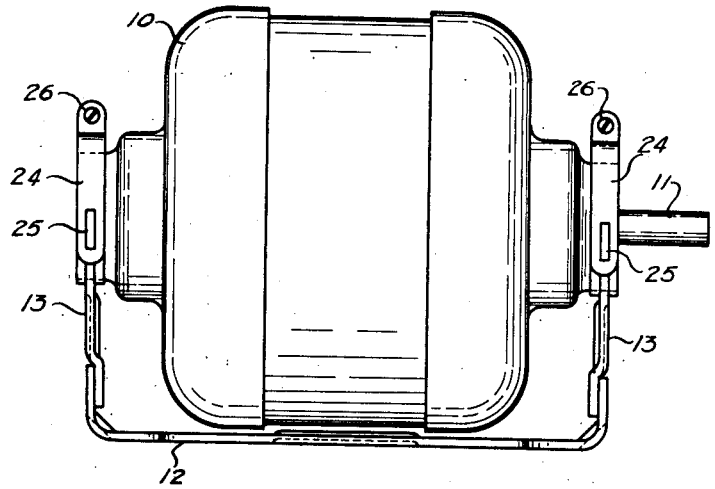
Fig. 1
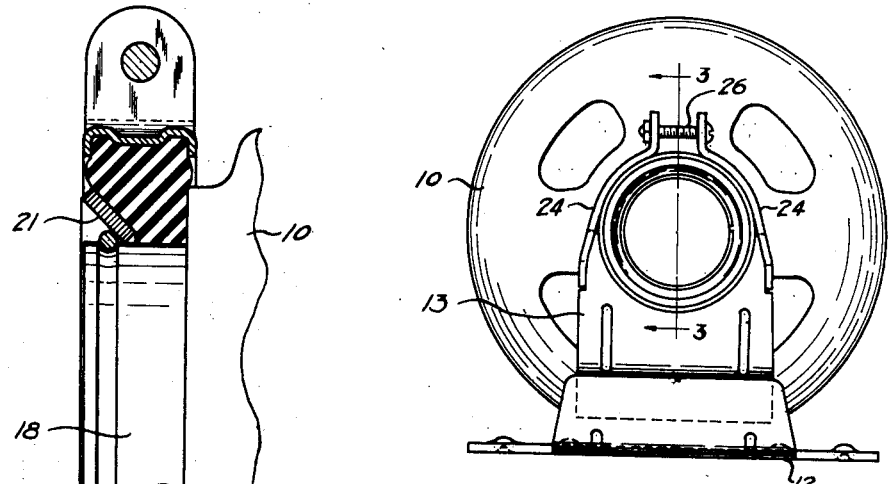
Fig. 2
Fig. 3
Fig. 4
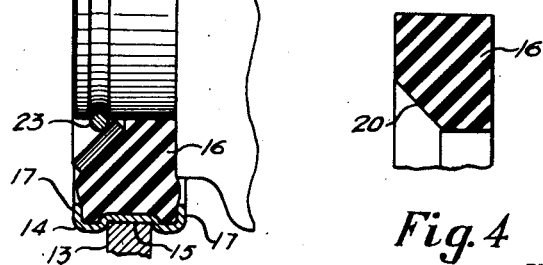
INVENTOR.
MARTIN L. SPAHR
BY
Kwis. Hudson & Kent
ATTORNEYS.

Patented Oct. 19, 1937

2,096,139

UNITED STATES PATENT OFFICE 2,096,139

MOTOR MOUNTING

Martin L. Spahr, Springfield, Ohio, assignor to Harris Products Company, Akron, Ohio, a corporation of Ohio Application August 21, 1935, Serial No. 37,205

3 Claims. (Cl. 248—26)

This invention relates to resilient mountings for electric motors and other apparatus, and has for its principal object the provision of a mounting that will insulate the motor or apparatus from its base both electrically and with respect to the transmission of vibrations and noise.

A further object of the invention is to provide a mounting of the type referred to that will permit oscillations of the motor or apparatus relative to the base.

A further object of the invention is to provide a resilient mounting of the type referred to that will be comparatively inexpensive, simple in construction, easily assembled and disassembled, and yet capable of performing its functions efficiently and substantially without deterioration for a comparatively long period of time.

Other objects of the invention and the features of novelty will be apparent from the following description taken in connection with the accompanying drawing, of which—

Fig. 1 is a side elevation of an electric motor with a mounting embodying my invention;

Fig. 2 is an end elevation thereof;

Fig. 3 is an enlarged section on the line 3—3 of Fig. 2; and

Fig. 4 is a cross section of one of the rubber rings, as molded and before being assembled with the other parts of the mounting.

While I have illustrated the principles of my invention in connection with an electric motor, it will be understood that the invention is also applicable to generators, pumps, and other apparatus, and where the term "motor" is used, in the claims, it will be understood that it is not thereby intended to limit them to an electric motor but that the term is intended to be used in the broader sense and to include other forms of the apparatus to which the mounting is applicable.

In the drawing, 10 represents an electric motor and 11 the shaft thereof from which power may be transmitted to any apparatus to be driven thereby. The base is indicated at 12 and is provided with the upright saddles 13 at its opposite ends in which the motor is mounted. Each of these saddles is provided with a semi-circular seat to receive a metal ring 14 which has an external circumferential groove 15 therein to receive the saddle, as shown in Fig. 3. The ring 14 surrounds a rubber ring 16 and holds the latter against radial expansion. The ring 14 is also provided with the inwardly turned flanges 17 which engage the sides of the ring 15 and prevent lateral displacement of the rubber ring relative to the metal ring 14.

The opposite ends of the motor are provided with cylindrical surfaces forming trunnions 18, and shoulders 19 at the inner ends of these trunnions which are engaged by one side of the rings 16, as will be seen from Fig. 3. The rubber rings are provided with conical surfaces 20 on their outer sides and these surfaces are engaged by a conical ring 21 which is slidable axially over the trunnions 18 to compress the rubber rings 16 and cause them to be deformed, as shown in Fig. 3, so as to conform to the interior of the rings 14 and also frictionally adhere to the trunnions 18 and the shoulders 19. The trunnions 18 are each provided with a circumferential groove 22 to receive a split wire snap ring 23 which is adapted to hold the ring 21 in position with the rubber ring 16 under compression. At the same time the pressure of the rubber ring 16 on the ring 21 causes the latter, because of the conical shape of its outer surface, to exert a contracting reaction on the snap ring 23 which securely locks the snap ring in its groove 22.

The compression of the rubber ring 16, as indicated in Fig. 3, causes it to tightly adhere to the trunnion 18 and the shoulder 19, as well as to the rings 14 and 21, so as to be non-rotatable with respect thereto.

When the rubber rings 16 have been assembled on the trunnions 18, with the metal rings 14 and 21, as shown in Fig. 3, the motor is placed in position on its base with the metal rings 14 resting in the semi-circular seats in the saddles 13. Arcuate straps 24 which are provided with slots to engage the lugs 25 on the saddles 13 are then placed in position, as shown in Figs. 1 and 2, and secured by means of the bolts 26 which are adapted to draw each pair of straps tightly around the upper half of the rings 14 and thereby firmly clamp these rings to the saddles 13 so that the rings 14 will be held against rotation in the saddles.

The arrangement illustrated and described above adapts the base 12 for side or overhead mounting with the motor in its normal upright position, since the rings 14 are rotatable to any desired position in the saddles 13 before the straps 24 are clamped. The arrangement also permits slight oscillations of the motor with respect to its base because of the ability of the rubber rings 16 to flex torsionally. At the same time the rubber rings, which are preferably made from a pliable stock, insulate the motor electrically from the base and also provide a cushion which prevents the transmission of mechanical vibrations from the motor to the base. The prevention of the transmission of vibrations from the motor to the base insures against the transmission of sounds and, therefore, the motor or other apparatus will be quiet in operation and adapted for use in places where the elimination of noise or its reduction to a minimum is an important consideration.

While I have illustrated and described what I now consider to be the preferred form for applying the invention to electric motors and other forms of apparatus, it will be understood that various changes may be made in the details of construction without departing from the spirit of the invention as defined in the appended claims.

Having thus described my invention, I claim:

1. In a resilient mounting for motors and the like, the combination of a base, a motor provided with trunnions and shoulders adjacent said trunnions, rubber rings non-rotatively engaging said trunnions and said shoulders, rings surrounding said rubber rings and holding the latter against radial expansion, said rubber rings having substantially conical surfaces on the sides opposite those engaging said shoulders, rings slidable axially of said trunnions and having conical surfaces engaging said conical surfaces on the rubber rings, means on said trunnions for holding said slidable rings in position with said rubber rings under compression, and means for detachably and non-rotatably securing the second mentioned rings to said base.

2. In a resilient mounting for motors and the like, the combination of a base, a motor provided with trunnions and shoulders adjacent said trunnions, rubber rings non-rotatively engaging said trunnions and said shoulders, rings surrounding said rubber rings and provided with inwardly turned flanges on the opposite edges to engage the sides of said rubber rings, said rubber rings having substantially conical surfaces on the sides opposite those engaging said shoulders, rings slidable axially of said trunnions and having conical surfaces engaging said conical surfaces on the rubber rings, snap rings on said trunnions for holding said slidable rings in position with said rubber rings under compression, and means for detachably and non-rotatably securing the second mentioned rings to said base.

3. In a resilient mounting for motors and the like, the combination of a base, a motor provided with trunnions, rubber rings on said trunnions and non-rotatable relative thereto, rings engaging said rubber rings and whereby the latter are compressed, the last mentioned rings having substantially conical outer surfaces, retaining rings on said trunnions engaged by said conical surfaces and locked in position thereby, and means for non-rotatively securing the peripheries of said rubber rings to said base.

MARTIN L. SPAHR.